(12) United States Patent
Lamb

(10) Patent No.: US 8,713,692 B2
(45) Date of Patent: Apr. 29, 2014

(54) CROWD VALIDATED INTERNET DOCUMENT WITNESSING SYSTEM

(75) Inventor: Richard Lamb, Millbrae, CA (US)

(73) Assignee: Richard Lamb, Petaluma, CA (US)

(*) Notice: Subject to any disclaimer, the term of this patent is extended or adjusted under 35 U.S.C. 154(b) by 136 days.

(21) Appl. No.: 13/436,947

(22) Filed: Apr. 1, 2012

(65) Prior Publication Data

US 2013/0263274 A1  Oct. 3, 2013

(51) Int. Cl.
*H04L 29/06* (2006.01)
*G06F 21/10* (2013.01)

(52) U.S. Cl.
CPC ............... *H04L 29/06* (2013.01); *G06F 21/10* (2013.01)
USPC ............ 726/26; 707/687; 707/690; 707/694; 707/698; 707/706

(58) Field of Classification Search
CPC ........ H04L 29/06; G06F 21/10; G06F 21/645
USPC ......................................................... 726/26
See application file for complete search history.

(56) References Cited

U.S. PATENT DOCUMENTS

| | | | | |
|---|---|---|---|---|
| 5,136,646 A * | 8/1992 | Haber et al. | ................... | 713/178 |
| 5,619,571 A * | 4/1997 | Sandstrom et al. | ........... | 380/200 |
| 5,936,149 A * | 8/1999 | Fischer | ......................... | 73/1.43 |
| 7,818,256 B1 * | 10/2010 | Ward et al. | ...................... | 705/51 |
| 2002/0004800 A1 * | 1/2002 | Kikuta et al. | .................. | 707/500 |
| 2002/0023221 A1 * | 2/2002 | Miyazaki et al. | ............. | 713/178 |
| 2002/0032856 A1 * | 3/2002 | Noguchi et al. | .............. | 713/156 |
| 2008/0104408 A1 * | 5/2008 | Mayer | ........................... | 713/178 |
| 2008/0208831 A1 * | 8/2008 | Farago et al. | ..................... | 707/5 |

OTHER PUBLICATIONS

Kwong et al., Authentic Publication of XML Document Data, Dec. 2001, Proceedings of the Second International Conference on Web Information Systems Engineering, WISE 2001, vol. 1, pp. 331-340.*

* cited by examiner

*Primary Examiner* — Morshed Mehedi
*Assistant Examiner* — Kenneth Chang

(57) ABSTRACT

A system and method that accepts material from the Internet, computes and maintains a computationally unique representation of the received material in a database, computes a computationally unique representation of the updated database state as a whole, publishes material and database representations in various forms for the global Internet audience to witness, and returns a time stamped attestation to the submitter of material as proof of the material being witnessed on the Internet along with unique database state and revenue generating advertisements. Published representations may include pictures, common words, or hexadecimal character string to facilitate Internet searching mechanisms.

5 Claims, 4 Drawing Sheets

Crowd Validated Internet Document Witnessing System
Richard Lamb  31 March 2012

Figure 3

CROWD VALIDATED INTERNET DOCUMENT WITNESSING SYSTEM

TECHNICAL FIELD

The present invention relates to the witnessing of digital material (text, document, picture, web page or other media) on the Internet as a proof of publication. More particularly, the present invention relates to a system and method that accepts material from the Internet, computes and maintains a computationally unique representation of the received material in a database, computes and publishes a computationally unique representation of the updated database state as a whole, and returns a time stamped attestation to the submitter of material as proof of the material being witnessed on the Internet along with unique database state and revenue generating advertisements.

DESCRIPTION OF INVENTION

With the continual rise in digital communication there is often a desire by authors of digital content to prove that such content was created on a certain date. Human mechanisms for witnessing and attesting to documents have a long history and have well established frameworks (e.g., notary, news paper publications, etc. . . . ). However, these mechanisms do not scale to the quantity or precision required by digital content. To address the increasingly digital nature of communication, many have developed comprehensive digital signature and time stamping services that allow the operators of such services to act as third party witnesses, usually for a fee. Such services only use the Internet as a transmission medium and do not take advantage of the Internet as the global public commons it has become. This aspect of the Internet makes it a perfect medium for witnessing content improving upon traditional publishing mediums due to the built-in indexing mechanisms provided by multiple search engine companies.

The author might simply publish their work on a web site for the world to see in the hopes that someone on the Internet reads the contents on a certain date and would be willing to attest to its publication at a later date. This is certainly one approach and one often used informally. Unfortunately, this method is not timely, certain or error free without the benefit of even the rudimentary editorial oversight and management that a newspaper brings to publications, e.g., archiving. Ideally, a system that faithfully published and archived all content received with a public check on the integrity of the archive could solve this problem. It is however difficult to guarantee that the people or existing systems (e.g., search engines) that witness documents have not deleted or modified their records, and therefore recollection of the contents, in some way as necessitated by operational or other requirements.

Storing the full content received from the Internet is currently beyond the capability of most computer systems although systems do exist to try to archive large parts of what has been "seen" on the Internet (e.g., Internet Archive: Wayback Machine). There may also be an interest in not necessarily publishing content in full while still seeking an attestation of its publication for privacy reasons (e.g., an e-mail message to your boss, photographs, etc). All an author may seek is that the content or some unique representation of the same has been witnessed by the Internet and to be able to recall an attestation of that at a later date as proof of prior publication.

By computing a cryptographic hash of the digital content as it is received and publishing and storing that in a database instead of the content itself, we solve the storage and privacy concerns described above. Similarly by updating the cryptographic hash of the overall database after the addition of each new piece of content and publishing this running hash on a web site and including it as part of the attestation response to content submission, we have provided a mechanism to verify the integrity of the database at any point in time. The nature of the cryptographic hash calculations are such that it is computational infeasible for anything but the original sequence of content and database updates to have resulted in the current database hash. This ensures the integrity of the database, and hence proof of witnessing of content, is maintained, auditable, and witnessed by the public.

BRIEF DESCRIPTION OF DRAWINGS

Figure 3:
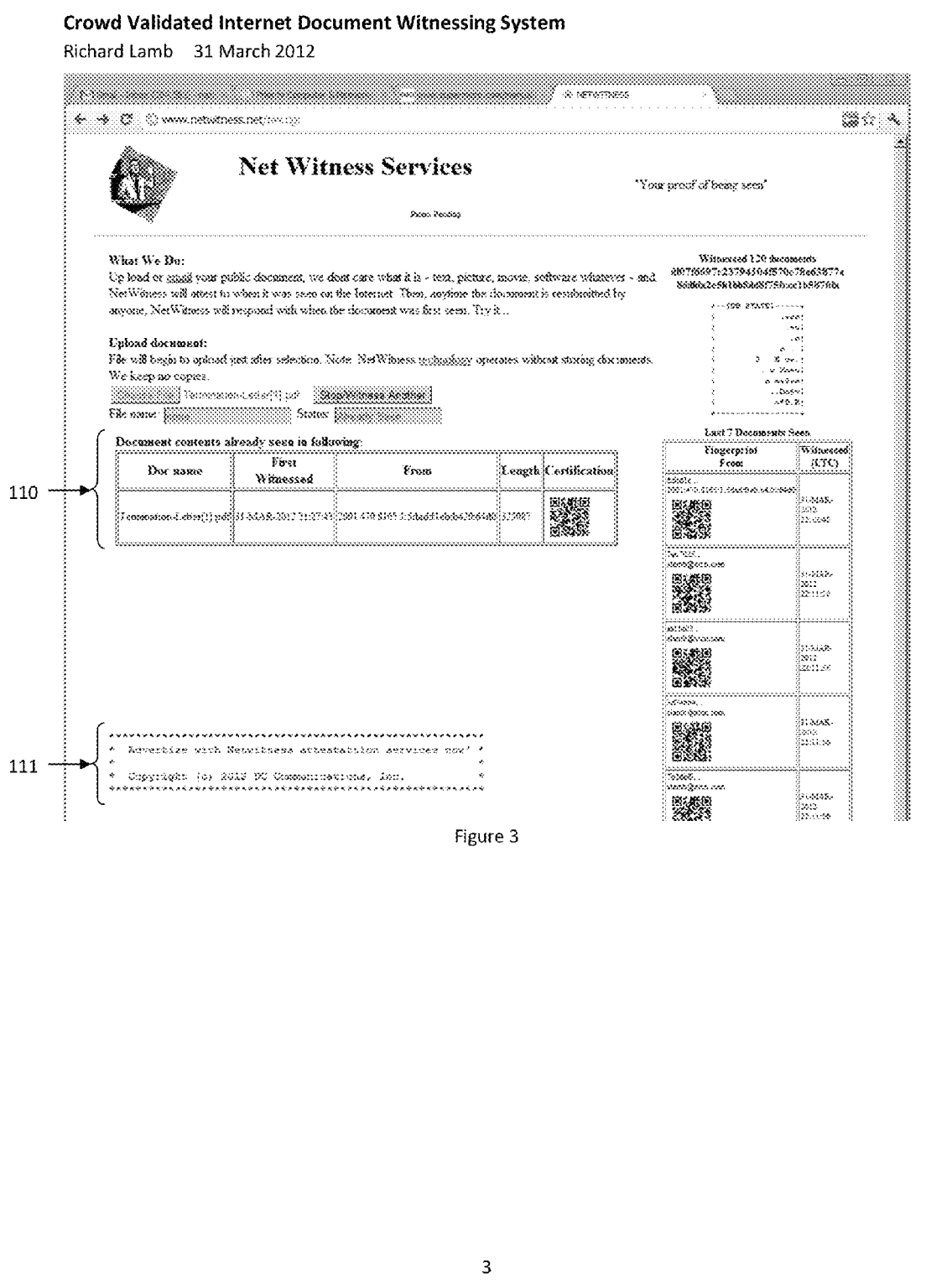

FIG. 3 shows an example screen display of web page in response to a file that has been previously witnessed according to the present invention.

PREFERRED EMBODIMENT

Figure 1:
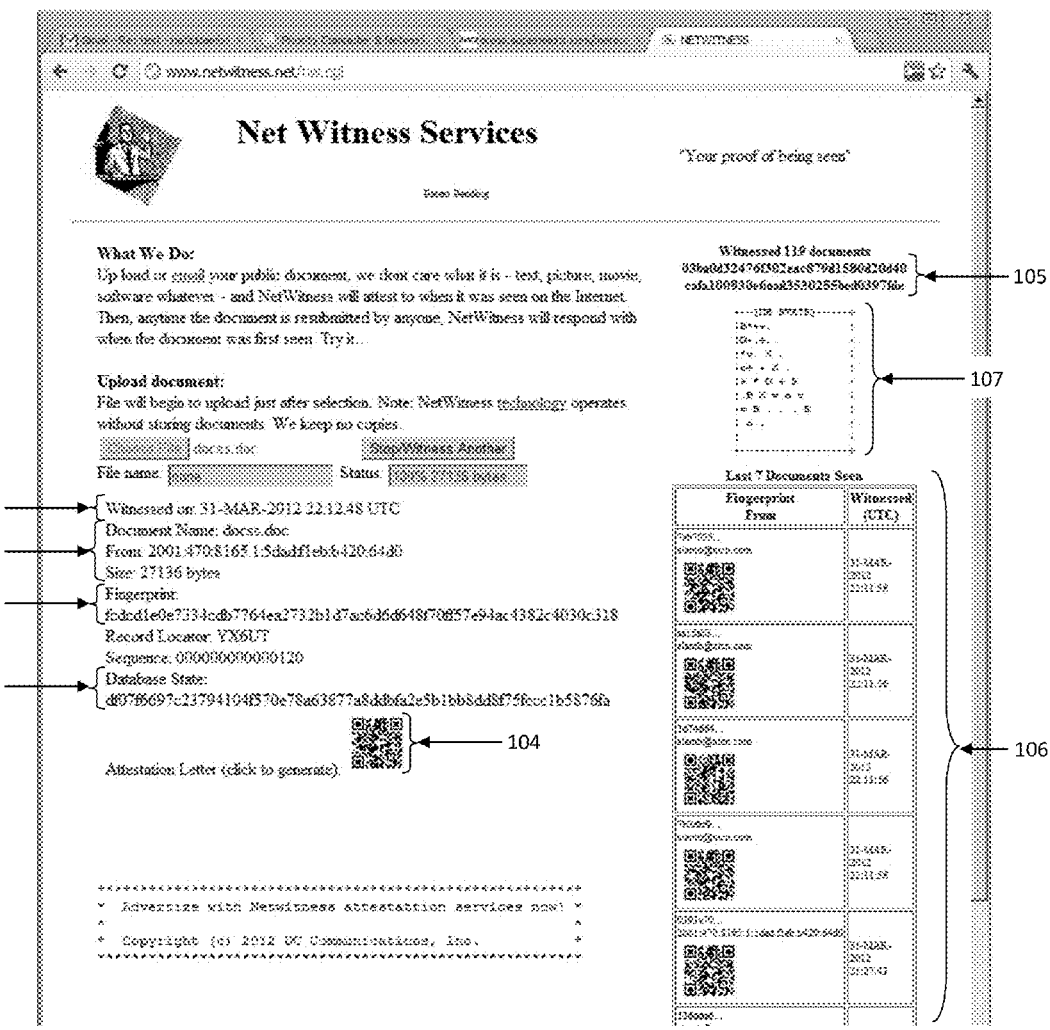
FIG. 1 shows an example screen display of web page after a file ("docss.doc") has been uploaded according to the present invention.
Figure 2:
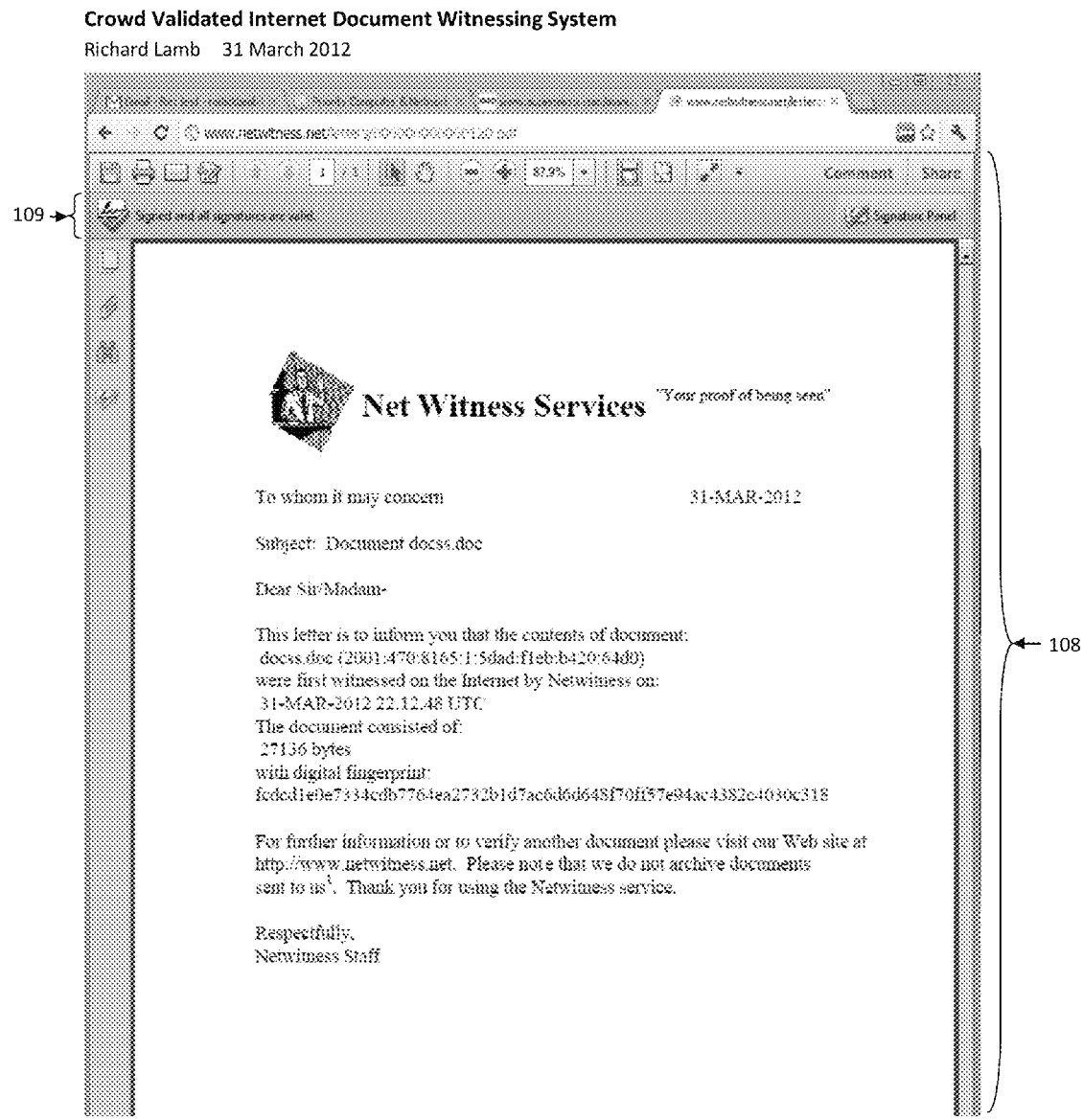
FIG. 2 shows an example of the automatically generated digitally signed document attesting to the witnessing of the uploaded file according to the present invention.
Figure 4:
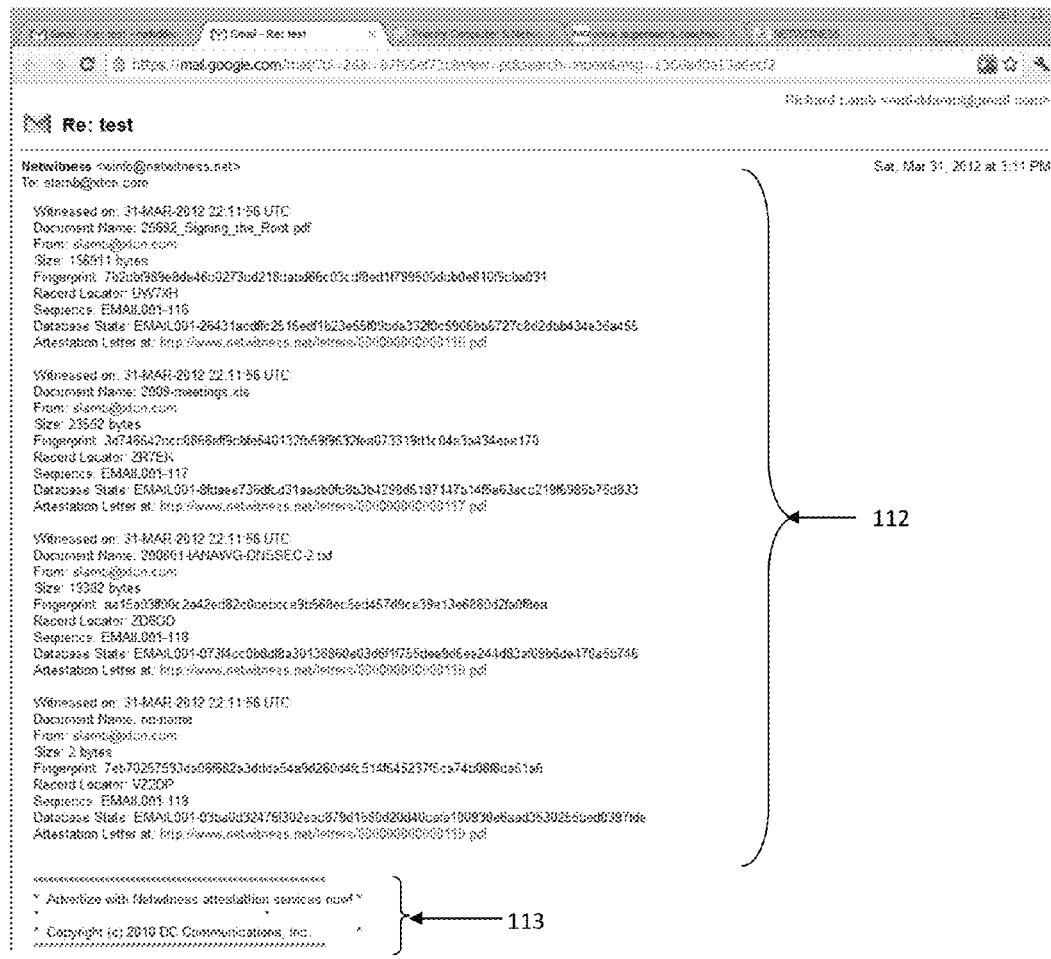
FIG. 4 shows an example e-mail response to files submitted to the system via e-mail according to the present invention.

In the preferred embodiment of the present invention the operator of the attestation service receives material via e-mail or web upload. A cryptographic hash is computed on the fly for each attachment in the e-mail or uploaded file. The hash (100) and associated information such as from e-mail or source Internet protocol (IP) address (101) and time of reception (102) are stored in a database. As the database itself is modified with each new entry, a hash of the database is also updated and stored with the last entry (103). This last item is used to maintain and validate the integrity of the database itself as proof it has not been surreptitiously modified. The system then returns via e-mail (112) or Web interface a response indicating the date and time the material was witnessed (102) along with a website link (104) to download, and print if desired, a digitally signed (109) document (108) attesting to the same. The response also contains the database hash (103) after the addition of the new entry as a means of later proving that the database has not been modified up to this point in time. The database hash (105) and recently received content hashes (106) are also published on the public system web site for public viewing by all visitors and search engines. To take advantage of the human capacity to better recognize pictures than numbers, the database hash is also represented by a unique picture (107).

Should the combination of hash and from data already exist in the database, an error is returned (either via e-mail or web interface) indicating that the material had already been witnessed on such and such a date (110). This is a way for submitter or others to determine or prove the document was witnessed earlier. Finally, in all responses there is a section for presenting material from advertisers (111,113) as a means of paying for or deriving revenue from the attestation service. A hash algorithm such as SHA256 or better is used making it computationally infeasible for any two documents to result in the same hash unless they are identical. In this way an author can be assured that her/his creation is properly witnessed without the system having to store and maintain the original material in whole. Hash calculations and response generations are distributed across multiple e-mail and web servers to allow for service growth and advertizing tailored to region and specific interest groups. In addition to the inherent public auditing part each user of the system plays, regular third party audits may be performed on the service using the easily verifiable audit trail of database hash updates to further bolster trust in the operation of the system. The computational infeasibility of recreating the database hash with anything but the sequence of original content means that only two externally recorded responses to submissions are needed to verify the database's integrity for any period.

What is claimed:

1. An automated method for attesting to publication of digital content, including but not limited to documents, email, web pages, images, video, or software, on a public Internet, comprising the steps of:

provering for author generation of digital content;

receiving the digital content via the public Internet;

calculating a cryptographic hash of the received digital content;

storing the cryptographic hash, ancillary author information, time of reception, and a cryptographic hash of an overall database into the database if the cryptographic hash of the digital content and the ancillary author information do not already exist in the database;

transmitting response information via the public Internet to an author indicating a time at which the digital content was received, ancillary author information, cryptographic hash of the digital content, cryptographic hash of the overall database after inclusion of author content, and an Internet address where the author may retrieve the response information in downloadable document form;

transmitting a response via the public Internet to the author including an attestation that the received digital content has already been seen with a time at which the digital content was received, ancillary original author information, cryptographic hash of the digital content, cryptographic hash of the overall database after inclusion of original author content, and an Internet address where the attestation is downloadable in permanent document form;

publishing at recurring times a current database hash and cryptographic hash of last received digital content on the public Internet for capture by one or more search engines;

detecting the capture by the one or more search engines of the current database hash and the cryptographic hash of the received digital content to generate proof of content publication via cryptographic audit trail; and digitally signing both of the response information in downloadable document form and the attestation in downloadable permanent document form to provide protection against modification.

2. The method of claim 1, further comprising representing the current database hash as a picture either digitally created or linked to existing digitized images.

3. The method of claim 1, further comprising hashing the ancillary author information and ancillary original author information to address privacy concerns.

4. The method of claim 1, wherein the reception of the digital content and the transmission of the response is any combination of e-mail, web page, secured e-mail, or secured web page.

5. The method of claim 1, further comprising cryptographically validating the ancillary author information, including an e-mail email address, via at least one of digitally signed e-mail and client side authenticated web connections.

* * * * *